US010655329B1

(12) United States Patent
Redford et al.

(10) Patent No.: US 10,655,329 B1
(45) Date of Patent: May 19, 2020

(54) COMPOSITE SHINGLE INCLUDING POLYKETONE

(71) Applicant: Raven Industries, Inc., Sioux Falls, SD (US)

(72) Inventors: Steven G. Redford, Brandon, SD (US); Derek Lee Coover, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 16/518,707

(22) Filed: Jul. 22, 2019

Related U.S. Application Data

(63) Continuation-in-part of application No. 15/944,685, filed on Apr. 3, 2018, now abandoned.

(51) Int. Cl.
*E04D 1/20* (2006.01)
*E04D 1/28* (2006.01)
*B32B 27/14* (2006.01)
*B32B 7/12* (2006.01)
*C09J 195/00* (2006.01)
*B32B 27/28* (2006.01)

(52) U.S. Cl.
CPC .................. *E04D 1/20* (2013.01); *B32B 7/12* (2013.01); *B32B 27/14* (2013.01); *B32B 27/288* (2013.01); *C09J 195/00* (2013.01); *E04D 1/28* (2013.01); *B32B 2260/02* (2013.01); *B32B 2419/06* (2013.01)

(58) Field of Classification Search
CPC ....... E04D 2001/005; E04D 1/12; E04D 1/20; B32B 27/288; B32B 5/16; B32B 2419/06
See application file for complete search history.

(56) References Cited

U.S. PATENT DOCUMENTS

| 2008/0029210 A1 | 2/2008 | Swei et al. |
| 2011/0162292 A1 | 7/2011 | Higley |
| 2015/0368904 A1 | 12/2015 | Humphreys |

OTHER PUBLICATIONS

U.S. Appl. No. 15/944,685, filed Apr. 3, 2018, Composite Shingle Including Polyketone.
"U.S. Appl. No. 15/944,685, Non Final Office Action dated Jan. 24, 2019", 10 pgs.

*Primary Examiner* — Patrick J Maestri
(74) *Attorney, Agent, or Firm* — Schwegman Lundberg & Woessner, P.A.

(57) ABSTRACT

Various embodiments disclosed relate to a composite shingle. The composite shingle includes a particle layer and a polyketone layer proximate to the particle layer.

20 Claims, 6 Drawing Sheets

COMPOSITE SHINGLE INCLUDING POLYKETONE

CROSS-REFERENCE TO RELATED APPLICATION

This application claims priority to U.S. patent application Ser. No. 15/944,685, filed Apr. 3, 2018, which application is incorporated by reference herein in its entirety.

BACKGROUND

Roofing shingles come in many variations. For example, shingles can be classified as strip shingles and composite or laminated shingles. Generally, composite shingles include a particle layer an asphalt layer, a fiber glass layer and a polyethylene or polypropylene backing layer. Other composite shingles may include an additional asphalt layer in place of the polyethylene or polypropylene layer. These layers can add strength and durability to the composite shingle. However, including these layers and the materials forming them can add weight to the individual shingles, which in aggregate can make it difficult to transport the shingles or handle them during installation.

SUMMARY OF THE DISCLOSURE

The present disclosure provides a composite shingle. The composite shingle includes a particle layer and a polyketone layer proximate to the particle layer.

The present disclosure further provides a composite shingle. The composite shingle includes a particle layer including a plurality of particles disposed substantially in a plane. The composite shingle further includes an asphalt layer in direct contact with the particle layer. The composite shingle further includes a polyketone layer in direct contact with the asphalt layer. The composite shingle further includes an adhesive layer contacting the polyketone layer.

The present disclosure further provides a roof. The roof includes a composite shingle that includes a particle layer and a polyketone layer proximate to the particle layer.

The present disclosure further provides a roof. The roof comprises a composite shingle. The composite shingle includes a particle layer including a plurality of particles disposed substantially in a plane. The composite shingle further includes an asphalt layer in direct contact with the particle layer. The composite shingle further includes a polyketone layer in direct contact with the asphalt layer. The composite shingle further includes an adhesive layer contacting the polyketone layer.

The present disclosure further provides a method of using a composite shingle. The composite shingle includes a particle layer and a polyketone layer proximate to the particle layer. The method includes forming a roof including the composite shingle.

The present disclosure further provides a method of using a composite shingle. The composite shingle includes a particle layer including a plurality of particles disposed substantially in a plane. The composite shingle further includes an asphalt layer in direct contact with the particle layer. The composite shingle further includes a polyketone layer in direct contact with the asphalt layer. The composite shingle further includes an adhesive layer contacting the polyketone layer. The method includes forming a roof including the composite shingle.

The present disclosure further provides a method of making a composite shingle. The method includes contacting a polyketone layer with at least one of a particle layer, an asphalt layer, a reinforcing layer, and an adhesive layer.

There are several advantages to using the composite shingles or methods of making the composite shingle described herein, some of which are unexpected. For example, according to some embodiments including a polyketone layer can reduce the overall weight of an individual composite shingle as compared, for example, to a corresponding composite shingle that includes a polyethylene or polypropylene layer instead of a polyketone layer. Moreover, according to some embodiments including a polyketone layer can reduce the overall weight of an individual composite shingle as compared, for example, to a corresponding composite shingle that includes an additional asphalt layer instead of a polyketone layer. According to some examples, the reduction in weight can allow for more composite shingles to be shipped at any given time thus reducing transportation costs. Moreover, the reduction of weight can make it easier to install composite shingles. Additionally, according to some embodiments, inclusion of polyketone as opposed to polyethylene or polypropylene can increase the strength of the composite shingle. According to some embodiments, this can allow for the manufacture of composite shingles having sufficient strength, but having fewer layers. According to some embodiments, inclusion of polyketone as opposed to polyethylene or polypropylene can allow for the composite shingle to be thinner than the corresponding shingle having a polyethylene or polypropylene layer. According to some embodiments, the polyketone layer can increase the flame retardancy characteristics of the composite shingle as compared to the corresponding composite shingle including a polyethylene or polypropylene layer. According to some embodiments, the polyketone layer has a higher melting temperature than polyethylene layer or polypropylene layer, which allows for higher processing temperatures during manufacturing of the composite shingle. According to some embodiments, including the polyketone layer can allow for the composite shingle to be free of a reinforcing layer as opposed to the corresponding composite shingle including the polyethylene layer of polypropylene layer. According to some embodiments, including the polyketone layer as opposed to a polypropylene layer, polyethylene layer, or additional asphalt layer can result in the shingle having a comparatively higher tensile strength. Therefore, according to some embodiments, the composite shingle is more resilient and less likely to tear or break easily upon an application or force.

BRIEF DESCRIPTION OF THE FIGURES

In the drawings, which are not necessarily drawn to scale, like numerals describe substantially similar components throughout the several views. The drawings illustrate generally, by way of example, but not by way of limitation, various embodiments discussed in the present document.

DETAILED DESCRIPTION

Figure 1A:
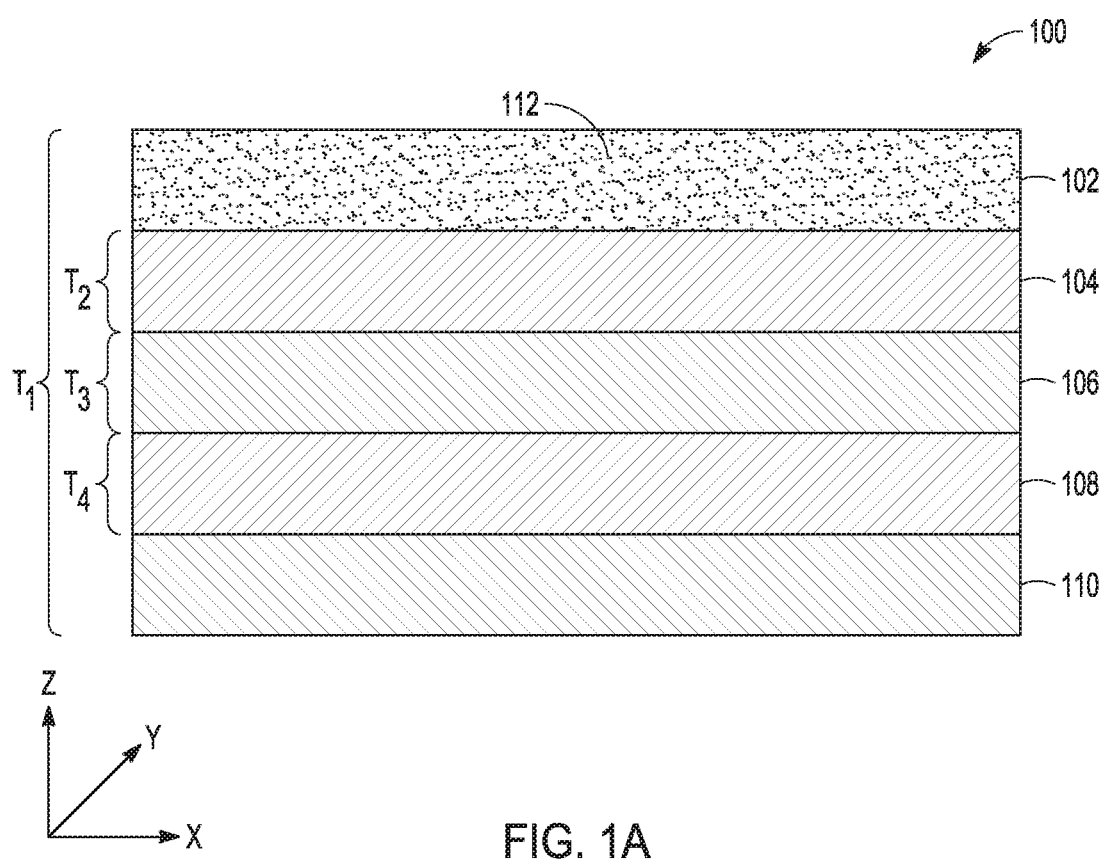
FIG. 1A is a sectional view of a composite shingle, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 9, 99%, 99.5%, 99.9%, 9999%, or at least about 99.999% or more, or 100%.

The term "organic group" as used herein refers to any carbon-containing functional group. Examples can include an oxygen-containing group such as an alkoxy group, aralkyloxy group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted C$_1$-C$_{100}$)hydrocarbyl, wherein R can be hydrogen (in examples that include other carbon atoms) or a carbon-based moiety, and wherein the carbon-based moiety can be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, or cycloalkylalkyl. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbon groups that do not contain heteroatoms in the ring. Thus, aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include about 1 to about 12, about 1 to about 20, or about 1 to about 40 carbon atoms bonded to the oxygen atom, and can further include double or triple bonds, and can also include heteroatoms. For example, an allyloxy group or a methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines, R$_2$NH wherein each R is independently selected, such as dialkylamines, diarylamines, aralkylamines, and the like; and R$_3$N wherein each R is independently selected, such as trialkylamines, dialkylarylamines, alkyldiarylamines, triarylamines, and the like. The term "amine" also includes ammonium ions as used herein.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof. Hydrocarbyl groups can be shown as (C$_a$-C$_b$)hydrocarbyl, wherein a and b are integers and mean having any of a to b number of carbon atoms. For example, (C$_1$-C$_4$)hydrocarbyl means the hydrocarbyl group can be methyl (C$_1$), ethyl (C$_2$), propyl (C$_3$), or butyl (C$_4$), and (C$_0$-C$_b$)hydrocarbyl means in certain embodiments there is no hydrocarbyl group.

The term "weight-average molecular weight" as used herein refers to M$_w$, which is equal to $\Sigma M_i^2 n_i / \Sigma M_i n_i$, where n$_i$ is the number of molecules of molecular weight M$_i$. In various examples, the weight-average molecular weight can be determined using light scattering, small angle neutron scattering, X-ray scattering, and sedimentation velocity.

As used herein, the term "polymer" refers to a molecule having at least one repeating unit and can include copolymers.

The polymers described herein can terminate in any suitable way. In some embodiments, the polymers can terminate with an end group that is independently chosen from a suitable polymerization initiator, —H, —OH, a substituted or unsubstituted (C$_1$-C$_{20}$)hydrocarbyl (e.g., (C$_1$-C$_{10}$)alkyl or (C$_6$-C$_{20}$)aryl) interrupted with 0, 1, 2, or 3 groups independently selected from —O—, substituted or unsubstituted —NH—, and —S—, a poly(substituted or unsubstituted (C$_1$-C$_{20}$)hydrocarbyloxy), and a poly(substituted or unsubstituted (C$_1$-C$_{20}$)hydrocarbylamino).

According to various embodiments of this disclosure a composite shingle can include a polyketone layer. As described herein the presence of the polyketone layer in the composite shingle can provide several advantages relative to comparable composite shingles that are free of a polyketone layer.

Figure 1B:
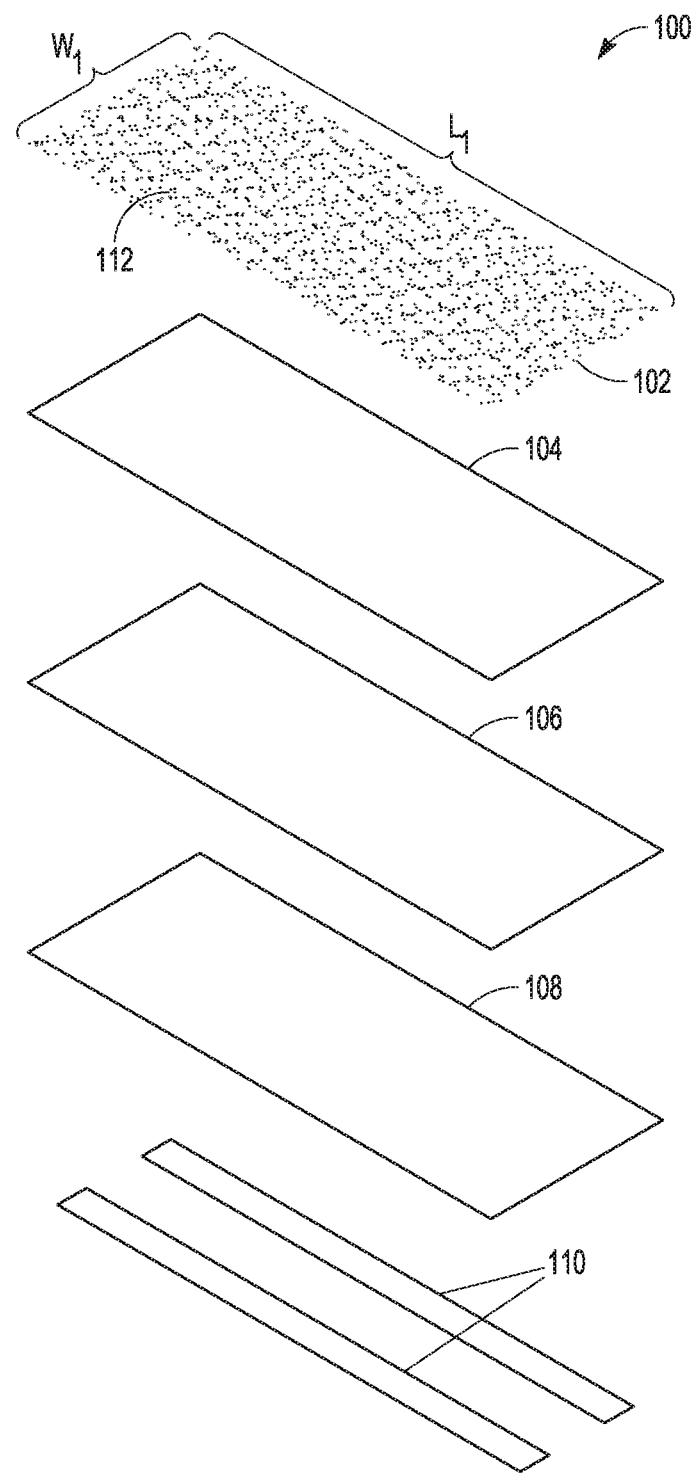
FIG. 1B is an exploded view of the composite shingle of FIG. 1A, in accordance with various embodiments.

FIG. 1A is a sectional view of composite shingle 100. FIG. 1B is an exploded view of composite shingle 100. FIGS. 1A and 1B show many of the same components and are discussed concurrently. Composite shingle 100 includes several layers of materials that are joined to each other to form composite shingle 100. The layers of composite shingle 100 include particle layer 102, asphalt layer 104, reinforcing layer 106, polyketone layer 108, and adhesive layer 110.

As shown in FIG. 1A, particle layer 102 is in direct contact with asphalt layer 104. Asphalt layer 104 is positioned between particle layer 102 and reinforcing layer 106 and is further in direct contact with reinforcing layer 106. Reinforcing layer 106 is positioned between asphalt layer 104 and polyketone layer 108 and is further in direct contact with polyketone layer 108. Polyketone layer 108 is positioned between reinforcing layer 106 and adhesive layer 110 and is further in direct contact with reinforcing layer 106. Adhesive layer 110 is in direct contact with polyketone layer 108. Although the respective layers of composite shingle 100 are shown in direct contact with each other, in other embodiments an intercalating adhesive layer such as a second asphalt layer or a tie layer can be present between any layers to improve adhesion therebetween.

If present, the tie layer can include a tie resin to help hold the multilayered structure together. A tie resin, or compatibilization agent, can increase compatibility between two or more polymers. For example, a compatibilization agent can be a tie layer between layers that can increase the bonding strength between the layers, or can be an agent added to the layer to increase miscibility of the other components of the layer. A compatibilization agent can be passive (e.g., does not react with other components of the layers) or reactive (e.g., reacts with other components of the layers, such as to form crosslinks or grafting). Examples of compatibilization agents can include silane coupling agents, titanate coupling agents, silane adhesion promoters, phenolic adhesion promotors, titanate adhesion promotors, zirconate adhesion promotors, modified polyolefins (e.g., modified to include one or more polar groups, such as a copolymer including polyethylene repeating units and polyolefin repeating units including one or more polar functional groups, such as a copolymer including polyethylene and repeating units formed from maleic anhydride or maleic acid, such as Bynel® 4157, or a polyethylene-co-vinyl acetate such as Polysciences Cat. No. 25359-25), styrene-based polymers (e.g., a polymer including styrene and butadiene repeating units, such as Krayton® D1102), methacrylate-based polymers, polycaprolactone-based polymers, polycaprolactone polyester/poly(tetramethylene glycol) copolymers, methacrylate-t-terminated polystyrene, mixture of aliphatic resins of low of medium molecular weight, and tri-block copolymers.

Composite shingle 100 can be designed to have any suitable dimensions. For example, composite shingle 100 can be dimensioned to have any suitable surface area or thickness for any roofing application. For example, a thickness $T_1$ of composite shingle may be in a range of from about 1 mm to about 10 mm, about 3 mm to about 4 mm, or less than, equal to, or greater than about 1 mm, 1.5, 2, 2.5, 3, 3.5, 4, 4.5, 5, 5.5, 6, 6.5, 7, 7.5, 8, 8.5, 9, 9.5, or about 10 mm. As a further example, a width $W_1$ of a major surface of composite shingle 100 may be in a range of from about 15 cm to about 100 cm, about 25 cm to about 40 cm, or less than, equal to, or greater than about 15 cm, 20, 25, 30, 35, 40, 45, 50, 55, 60, 65, 70, 75, 80, 85, 90, 95, or about 100 cm. As a further example, a length $L_1$ of a major surface of composite shingle 100 may be in a range of from about 15 cm to about 200 cm, about 25 cm to about 60 cm, or less than, equal to, or greater than about 15 cm, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or about 200 cm.

According to various embodiments of the present disclosure a thickness $T_1$ of composite shingle 100 can be in a range of from about 12 μm to about 510 μm, about 12 μm to about 255 μm, less than, equal to, or greater than about 12 μm, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, or about 510 μm. According to some embodiments, composite shingle 100 can be provided on a roll as opposed to being supplied as individual shingles.

As shown in FIGS. 1A and 1B, particle layer 102 includes a plurality of particles 112. Particles 112 are dispersed substantially in a plane extending in a x-y direction. Particles can serve multiple functions in composite shingle 100. For example, particles 112 can serve as a protective layer to shield other components (e.g., asphalt layer 104, reinforcing layer 106, or polyketone layer 108) of composite shingle 100 from impact and subsequent damage caused by objects such as hail or falling tree limbs. When an object such as hale impacts particles 112, the hail can be broken or the force associated with the impact can be absorbed by particle 112, thus transmitting less force to other components. Particles 112 can also serve to coat other components of composite shingle 100 to such a degree that the components are substantially shielded from exposure to ultra violet rays or water.

Particles 112 can be distributed over asphalt layer 104 to achieve any suitable mass of particles per area to meet any regulation or designer choice. In some embodiments particles 112 can be distributed over asphalt layer 104 to achieve a mass of the particles per area of the composite shingle in a range of from about 1 lbs/100 ft$^2$ to about 500 lbs/100 ft$^2$. As the mass of particles per area is increased, coverage of asphalt layer 104 is increased. However, this can also increase the weight of composite shingle 100. Therefore, the selected mass of particles per area in any particular embodiment of composite shingle 100 will depend on the balance between covering a component of composite shingle such as asphalt layer 104 versus achieving a desired weight of composite shingle 100.

Each particle 112 in particle layer 102 can be the same grade or the particle layer 120 can include a mixture of different grades of particles 112. Factors that may influence the choice of grade of particle 112 may include esthetics (e.g., the look of a finer versus a coarser distribution of particles) or function (e.g., coarser particles to aid in breaking down debris or protecting asphalt layer 104.

Individual particles 112 may be monolithic particles or agglomerations of particles. Monolithic particles are understood to be one free flowing particle that is free of a binder (e.g., a resin binder). Agglomerations of particles are understood to refer to one or more particles that are held together by a binder or other medium to form one unit. The particles of the agglomeration may be the same grade or different grades. Particle layer 102 may include 100 wt % monolithic particles 112 or 100 wt % agglomerations of particles 112. Alternatively, particle layer 102 may include a mixture of monolithic particles and agglomerations of particles. An individual portion of the monolithic particles and the agglomerations of particles can independently range from about 1 wt % to about 99 wt % of particle layer 102, about 30 wt % to about 70 wt %, or less than, equal to, or greater than about 1 wt %, 5, 10, 15, 20, 25, 30, 35, 40, 45, 50, 55, 60, 65, 70, 75, 80, 85, 90, 95, or about 99 wt % of particle layer 102.

Individual particles 112 can be randomly distributed in the plane of particle layer 102. Randomly distributed individual particles form no particular pattern. Alternatively, individual particles can be distributed in the plane of particle layer 102 according to a predetermined pattern. For example, individual particles 112 can be arranged in a series of rows. In some examples individual particles 112 of adjacent rows are directly aligned with each other. Alternatively, in some examples, individual particles 112 of adjacent rows may be staggered with respect to each other in order to minimize the amount of space on asphalt layer 104 that is free of coverage from particle layer 102. There are many ways to form the predetermined pattern. For example, individual particles can be fed through a screen onto asphalt layer 104. Individual particles 112 can also be placed on to asphalt layer 104 through electrostatic coating or precise drop coating.

The individual particles 112 can include any material. Considerations driving the selection of a specific material may include the esthetics (e.g., visual appearance) of the material or physical characteristics (e.g., hardness) of the material. Examples of materials for individual particles can include a mineral, a plastic, a metal, a cement, a clay, a glass, a ceramic, a wood, a wood fiber, a composite, or a mixture thereof. In some embodiments, each individual particle 112 is substantially the same color. In other embodiments individual particles 112 can have different colors. Specific colors can be selected to match another component of shingle 100. For example, it may be desirable to have the color of particles 112 match the color of asphalt layer 104, reinforcing layer 106, or polyketone layer 108 as this may make gaps in coverage appear less apparent. Having a mixture of colors of particles 112 can be used to create visually appealing patterns or designs and can also be used to produce a visual content such as a logo or trade dress. Specific colors can also be chosen to affect the degree to which ultra violet radiation is reflected or absorbed by composite shingle 100.

Particle layer 102 can include one layer of individual particles 112 or multiple layers of particles 112 stacked on top of each other. Individual particles 112 can be left exposed to the environment or coated. For example, particle layer 102 can be coated with a clear coat to effectively seal particle layer. This can help to improve the durability of particle layer 102 and composite shingle 100, but can also add weight to composite shingle 100.

Individual particles 112 of particle layer 102 can be at least partially embedded in asphalt layer 104. Asphalt layer 104 can serve to adhere various layers of composite shingle 100 to each other. Asphalt layer 104 can also serve to add strength to composite shingle 100 as well as perform a sealing function.

Asphalt layer 104 includes an asphalt material. As understood asphalt (alternatively known as bitumen) is a sticky, black, and highly viscous liquid or semi-solid form of petroleum. It can be found in natural deposits or may be a refined product. The amount of asphalt in asphalt layer may be any suitable amount. The amount of asphalt used may be determined by regulation (e.g., a housing code) or performance (e.g., achieving a desired weight or flexibility of composite shingle 100). For example, asphalt layer 104 can include asphalt in a range of from about 30 wt % to about 100 wt % of asphalt layer 104, about 90 wt % to about 100 wt %, or less than, equal to, or greater than about 30 wt %, 35, 40, 45, 50, 55, 60, 65, 70, 75, 80, 85, 90, 95, or about 100 wt %.

In examples where asphalt layer 104 includes less than 100 wt % asphalt the balance of asphalt layer 104 can include a material such as an asphalt filler. Examples of asphalt fillers include a limestone material or a plastic material. The asphalt layer can include one type of filler exclusively or a mixture of different filler. Where present, the asphalt filler or mixture of fillers can range from about 1 wt % to about 50 wt % of the asphalt layer, about 5 wt % to about 20 wt %, or less than, equal to, or greater than about 1, 5, 10, 15, 20, 25, 30, 35, 40, 45, or 50 wt %. The amount of asphalt filler in asphalt layer 104 can be tuned to control the weight asphalt layer 104, and composite shingle 100. Furthermore, the amount of asphalt filler can be tuned to control the flexibility of asphalt layer 104 and composite shingle 100. Beyond an asphalt filler, asphalt layer can include components such as colorants.

The thickness of asphalt layer 104 can be controlled to achieve any desired thickness. For example, the thickness $T_2$ of asphalt layer 104 can range from about 5% to about 20% of thickness $T_1$, about 7% to about 15%, or less than, equal to, or greater than about 5%, 6, 7, 8, 9, 10, 11, 12, 13, 14, 15, 16, 17, 18, 19, or about 20%.

As described herein, asphalt layer 104 can serve as a binder to hold individual layers of composite shingle 100 together. As shown in FIGS. 1A and 1B, asphalt layer 104 holds particle layer 102 and reinforcing layer 106 together.

Reinforcing layer 106 includes a reinforcing material or scrim. Where present, reinforcing layer 106 can help to add strength to shingle 100 or to decrease flexibility in composite shingle 100. Reinforcing layer 106 can include any suitable reinforcing material. For example, the reinforcing material can include a woven material, a non-woven material, or a mixture thereof. Examples of woven or non-woven materials can include fiber glass, nylon, cotton, cellulosic fiber, wool, rubber, polyester, polypropylene, or mixtures thereof.

The thickness of reinforcing layer 106 can be controlled to achieve any desired thickness. For example, the thickness $T_3$ of reinforcing layer 106 can range from about 5% to about 20% of thickness $T_1$, about 7% to about 15%, or less than, equal to, or greater than about 5%, 6, 7, 8, 9, 10, 11, 12, 13, 14, 15, 16, 17, 18, 19, or about 20%. The reinforcing material can be at least partially embedded in asphalt layer 104. The reinforcing material can also be at least partially embedded in another layer such as polyketone layer 108.

Polyketone layer 108 contacts reinforcing layer 106. Polyketone layer includes a polyketone. Polyketones are polymers that include a repeating unit having a ketone. The presence of the polyketone can help to increase the strength of composite shingle 100 and alter the flexibility of composite shingle 100. Polyketones have many different properties that are beneficial to composite shingle 100. For example, polyketones have relatively high impact strength resulting from the relatively flexible carbonyl and olefin backbone. Polyketones are also highly resistant to hydrocarbon solvents, salts, acids, and bases. Polyketones also offer good wear resistance and serve as good barriers against gases and hydrocarbons. Polyketones also offer good inherent flame retardancy due, in part, to a natural char layer that is formed upon combustion of the polyketone that insulates heat and oxygen from the flame. Furthermore, polyketones have high melting temperatures that can aid in processability of the polyketone during manufacturing of composite shingle 100. Many of these properties of the polyketone are superior to conventional composite shingles that use a different polymer such as a polyethylene or polypropylene. Additionally, compared to polyethylene and polypropylene, polyketones on balance are lighter, thus allowing for a comparative reduction in weight between composite shingles using a polyethylene or polypropylene and composite shingle 100 using polyketone.

The polyketone can be in a range of from about 20 wt % to about 100 wt % of polyketone layer 108, about 90 wt % to about 100 wt %, or less than, equal to, or greater than about 20 wt %, 25, 30, 35, 40, 45, 50, 55, 60, 65, 70, 75, 80, 85, 90, 95, or about 100 wt %. The polyketone can be any suitable polyketone. An example of a suitable polyketone can include a polyketone including a repeating unit having the structure according to Formula I:

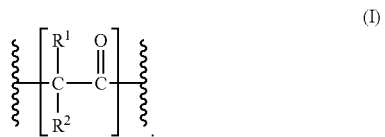

In Formula I, $R^1$ and $R^2$ can be independently chosen from —H, —OH, substituted or unsubstituted $(C_1-C_{20})$ hydrocarbyl. In further examples the $(C_1-C_{20})$hydrocarbyl is chosen from $(C_1-C_{20})$alkyl, $(C_1-C_{20})$alkenyl, $(C_1-C_{20})$alkynyl, $(C_1-C_{20})$acyl, $(C_1-C_{20})$cycloalkyl, $(C_1-C_{20})$aryl, and $(C_1-C_{20})$alkoxy, combinations thereof.

In additional embodiments, the polyketone can be a copolymer that includes repeating units having the structures according to Formula II or Formula III:

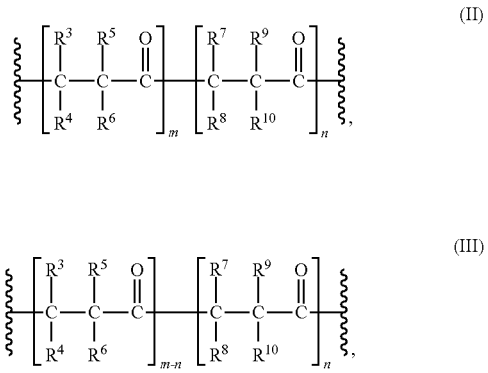

In formula II or III, $R^3$, $R^4$, $R^5$, $R^6$, $R^7$, $R^8$, $R^9$, and $R^{10}$ can be independently chosen from —H, —OH, substituted or unsubstituted $(C_1-C_{20})$hydrocarbyl. In further embodiments, the $(C_1-C_{20})$hydrocarbyl can be chosen from $(C_1-C_{20})$alkyl, $(C_1-C_{20})$alkenyl, $(C_1-C_{20})$alkynyl, $(C_1-C_{20})$acyl, $(C_1-C_{20})$ cycloalkyl, $(C_1-C_{20})$aryl, and $(C_1-C_{20})$alkoxy, combinations thereof. In further embodiments $R^{10}$ can be —CH$_3$. In further embodiments, $R^3$, $R^4$, $R^5$, $R^6$, $R^7$, $R^8$, and $R^9$ can each be —H. In any embodiment of Formula II a degree of polymerization of m and n are independently between 0 and 1 and the repeating can be in random, block, or alternating configuration.

In embodiments where the polyketone is a copolymer, the polyketone can include any suitable additional repeating units. For example, the polyketone copolymer can include a repeating unit derived from ethylene, propylene, vinyl chloride, vinylidene chloride, styrene, acrylonitrile, tetrafluoroethylene, methyl methacrylate, vinyl acetate, isoprene, chloroprene, or a mixture thereof.

Polyketone layer 108 may include one polyketone or a mixture of polyketones. If polyketone layer 108 includes a mixture of polyketones, the polyketones can differ by composition (e.g., different repeating units or arrangement of repeating units). Furthermore, individual polyketone polymers can have different weight-average molecular weights. The weight-average molecular weight of any individual polyketone can be in a range of from about 5000 Daltons to about 50,000 Daltons, about 15,000 Daltons to about 25,000 Daltons, or less than, equal to, or greater than about 5,000 Daltons, 10,000, 15,000, 20,000, 25,000, 30,000, 35,000, 40,000, 45,000, or about 50,000 Daltons.

In examples where polyketone layer 108 includes less than 100 wt % polyketone, polyketone layer 108 can include many suitable additives. For example, polyketone layer 108 can include a colorant. The colorant can be chosen from many suitable pigments such as titanium oxide or carbon black. The colorant can be chosen to substantially match the color of particles 112. This can be helpful to help mask areas where particle layer 102, asphalt layer 104, or reinforcing layer 106 do not fully cover polyketone layer 108. Where present, the colorant can be in any range of polyketone layer 108. For example, the colorant can be present from about 0.001 wt % to about 8 wt % of polyketone layer 108, about 0.01 wt % to about 3 wt %, or less than, equal to, or greater than about 0.001 wt %, 0.01, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, 5, 5.2, 5.4, 5.6, 5.8, 6, 6.2, 6.4, 6.6, 6.8, 7, 7.2, 7.4, 7.6, 7.8, or about 8 wt %.

The polyketone can further include a flame retardant. The flame retardant additive can enhance the inherent flame retardant characteristics of the polyketone described herein. The flame retardant additive can account for any wt % of polyketone layer 108. For example, the flame retardant can range from about 0.4 wt % to about 20 wt % of polyketone layer 108, from about 4 wt % to about 15 wt %, or less than, equal to, or greater than about 0.4 wt %, 1, 1.5, 2, 2.5, 3, 3.5, 4, 4.5, 5, 5.5, 6, 6.5, 7, 7.5, 8, 8.5, 9, 9.5, 9.5, 10, 10.5, 11, 11.5, 12, 12.5, 13, 13.5, 14, 14.5, 15, 15.5, 16, 16.5, 17, 17.5, 18, 18.5, 19, 19.5, or about 20 wt %. Examples of suitable flame retardants include, for example, organophosphorous compounds such as organic phosphates (including trialkyl phosphates such as triethyl phosphate, tris(2-chloropropyl) phosphate, and triaryl phosphates such as triphenyl phosphate and diphenyl cresyl phosphate, resorcinol bis-diphenylphosphate, resorcinol diphosphate, and aryl phosphate), phosphites (including trialkyl phosphites, triaryl phosphites, and mixed alkyl-aryl phosphites), phosphonates (including diethyl ethyl phosphonate, dimethyl methyl phosphonate), polyphosphates (including melamine polyphosphate, ammonium polyphosphates), poly phosphites, polyphosphonates, phosphinates (including aluminum tris(diethyl phosphinate); halogenated fire retardants such as chlorendic acid derivatives and chlorinated paraffins; organobromines, such as decabromodiphenyl ether (decaBDE), decabromodiphenyl ethane, polymeric brominated compounds such as brominated polystyrenes, brominated carbonate oligomers (BCOs), brominated epoxy oligomers (BEOs), tetrabromophthalic anyhydride, tetrabromobisphenol A (TBBPA) and hexabromocyclododecane (HBCD); metal hydroxides such as magnesium hydroxide, aluminum hydroxide, cobalt hydroxide, and hydrates of the foregoing metal hydroxide; and combinations thereof. The flame retardant can be a reactive type flame-retardant (including polyols which contain phosphorus groups, 10-(2,5-dihydroxyphenyl)-10H-9-oxa-10-phospha-phenanthrene-10-oxide, phosphorus-containing lactone-modified polyesters, ethylene glycol bis (diphenyl phosphate), neopentylglycol bis(diphenyl phosphate), amine- and hydroxyl-functionalized siloxane oligomers). These flame retardants can be used alone or in conjunction with other flame retardants.

Polyketone layer 108 can further include stabilizers that stabilize the polyketone against damage caused by exposure to ultra violet radiation. This can help to improve the longevity of composite shingle 100 by helping to prevent breakdown of polyketone layer 108 upon exposure to ultra violet radiation. Where present, these stabilizers can account for any wt % of polyketone layer 108. For example, the stabilizer can range from about 0.5 wt % to about 20 wt % of the polyketone layer, about 5 wt % to about 10 wt %, or less than, equal to, or greater than about 0.5 wt %, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or about 20 wt %. Examples of suitable stabilizers can include a stabilizer chosen from an antioxidant, a hindered amine light stabilizer, an ultraviolet absorber, an antioxidant, an organosulfur compound, or a mixture thereof.

Polyketone layer 108 can further include a filler. The filler can be helpful to reduce the amount of polyketone that is use in composite shingle 100, this can reduce the costs associated with making composite shingle 100. Where present, the filler can account for any portion of polyketone layer 108. For example, the filler can range from about 1 wt % to about 60 wt % of polyketone layer 108, about 10 wt % to about 30 wt %, or less than, equal to, or greater than about 1 wt %, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or about 60 wt %.

In some embodiments, polyketone layer 108 can include a woven or non-woven material fully embedded therein. For example, the woven or non-woven can include any suitable reinforcing material. For example, the reinforcing material can include a woven material, a non-woven material, or a mixture thereof. Examples of woven or non-woven materials can include fiber glass, nylon, cotton, cellulosic fiber, wool, rubber, or mixtures thereof.

In some embodiments polyketone layer 108 can be a composite layer that includes a first layer including a polyketone and a second layer including a polyketone. The composite layer further includes a plastic layer disposed between the first and second layers. The plastic layer and the respective first and second layers may include an adhesive or tie layer disposed therebetween. The plastic layer can be free of a polyketone. Either or both of the first and second polyketone layers can include any of the additives or stabilizers described herein.

In some embodiments, polyketone layer 108 can be substantially free of at least one of a polyethylene, a polypropylene, and a mixture thereof.

The thickness of polyketone layer 108 can be controlled to achieve any desired thickness. For example, the thickness $T_4$ of polyketone layer 108 can range from about 5% to about 20% of thickness $T_4$, about 7° % to about 15%, or less than, equal to, or greater than about 5%, 6, 7, 8, 9, 10, 11, 12, 13, 14, 15, 16, 17, 18, 19, or about 20%.

According to various embodiments a thickness $T_4$ of polyketone layers 108, 208, or 308 can independently be in a range of from about 12 μm to about 255 μm, about 12 μm to about 100 μm, less than, equal to, or greater than about 12 μm, 20, 30, 40, 50, 55, 60, 70, 80, 90, 100, 110, 120, 130, 140, 150, 160, 170, 180, 190, 200, 210, 220, 230, 240, 250, or about 260 μm.

Composite shingle 100 further includes adhesive layer 110. Adhesive layer 110 can include an asphalt material, as descried herein, or any other suitable adhesive. As shown in FIG. 1B, adhesive layer 110 is present as two strips such that a least a portion of the surface to which adhesive layer 110 is attached is free of any adhesive. In further embodiments adhesive layer 110 can be configured to coat any portion of polyketone layer 108 that is desired.

While FIGS. 1A and 1B, show an embodiment of composite shingle 100 having each of particle layer 102, asphalt layer 104, reinforcing layer 106, polyketone layer 108, and adhesive layer 110, it is contemplated that further embodiments of composite shingle 100, can include additional layers of materials, different arrangements of the layers, or fewer layers.

Figure 2A:
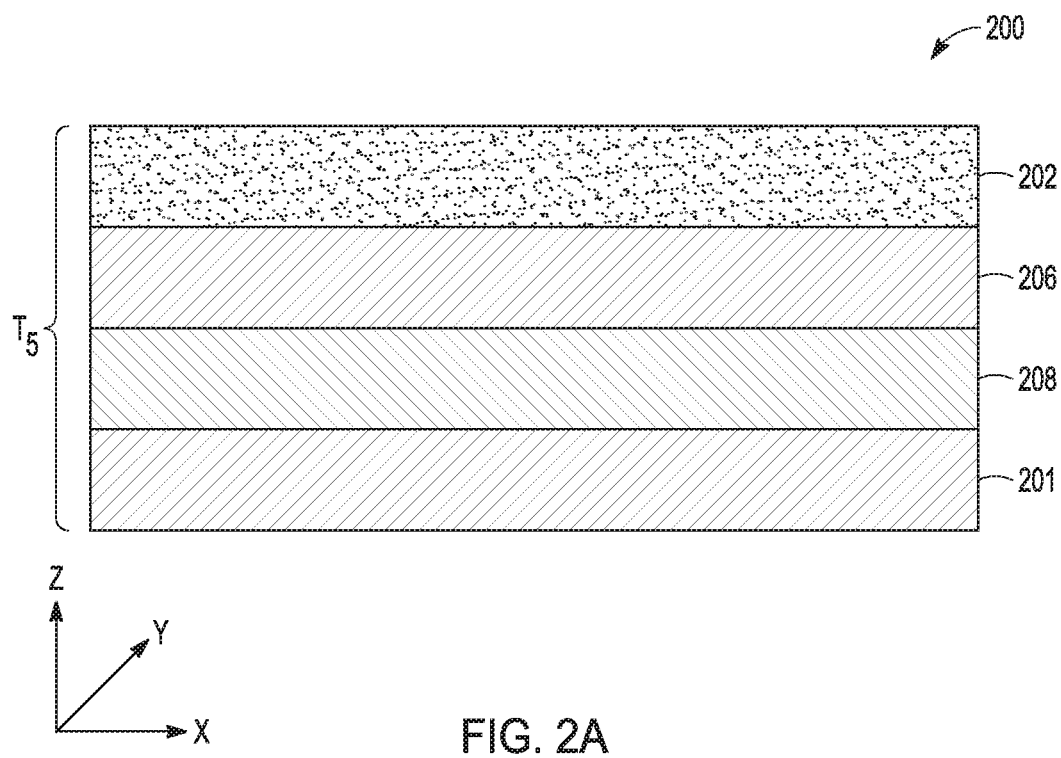
FIG. 2A is a sectional view of another composite shingle, in accordance with various embodiments.
Figure 2B:
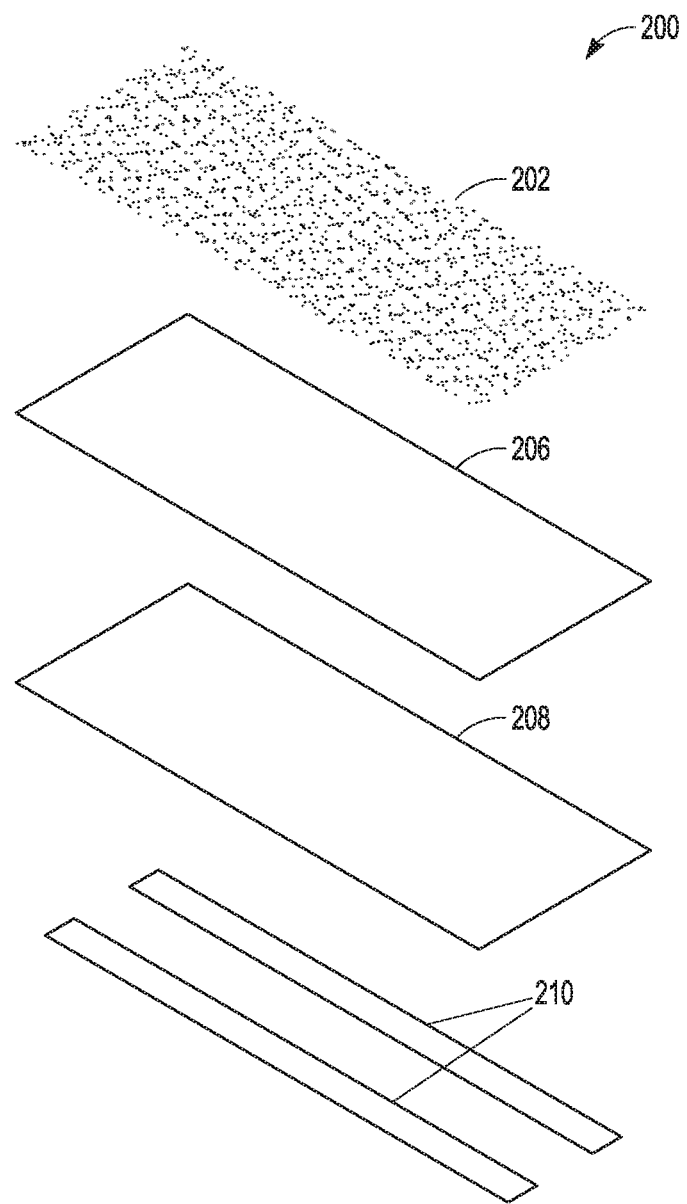
FIG. 2B is an exploded view of the composite shingle of FIG. 2A, in accordance with various embodiments.

As an example, FIGS. 2A and 2B show composite shingle 200. FIG. 2A is a sectional view of composite shingle 200 and FIG. 2B is an exploded view of composite shingle 200. FIGS. 2A and 2B show many of the same components and are discussed concurrently. Composite shingle 200 includes mineral layer 202, asphalt layer 204, polyketone layer 208, and adhesive layer 210. Mineral layer 202 can include many of the same components and properties as particle layer 102. Mineral layer 202 is directly attached to asphalt layer 204. Asphalt layer 204 can include the same or some of the same components and properties as particle layer 202. Asphalt layer 204 is directly attached to polyketone layer 208. Polyketone layer 208 includes the same or some of the materials or properties of polyketone layer 108. Polyketone layer 208 is directly attached to adhesive layer 210. Adhesive layer 210 includes the same or some of the materials or properties of adhesive layer 110. Any of the layers of composite shingle 200 can be adhered to each other directly or by a tie layer as described herein.

In composite shingle 200, polyketone layer 208 can be tuned to have suitable properties such as strength and flexibility to allow composite shingle 200 to be free of a reinforcing layer (e.g., a layer including the same or some of the materials or properties of reinforcing layer 106). This can allow shingle 200 to have a relatively thin profile and a low weight. For example, as compared to composite shingle 100, a thickness $T_5$ of composite shingle 200 can be about 0.5× less than $T_1$, about 1× less, about 1.5× less, about 2× less, about 2.5× less, about 3× less, about 3.5× less, about 4× less, about 4.5× less, or about 5× less. Similarly, a weight of composite shingle 200 can be about 0.5× less than a weight of composite shingle 100, about 1× less, about 1.5× less, about 2× less, about 2.5× less, about 3× less, about 3.5× less, about 14× less, about 4.5× less, or about 5× less.

Figure 3A:
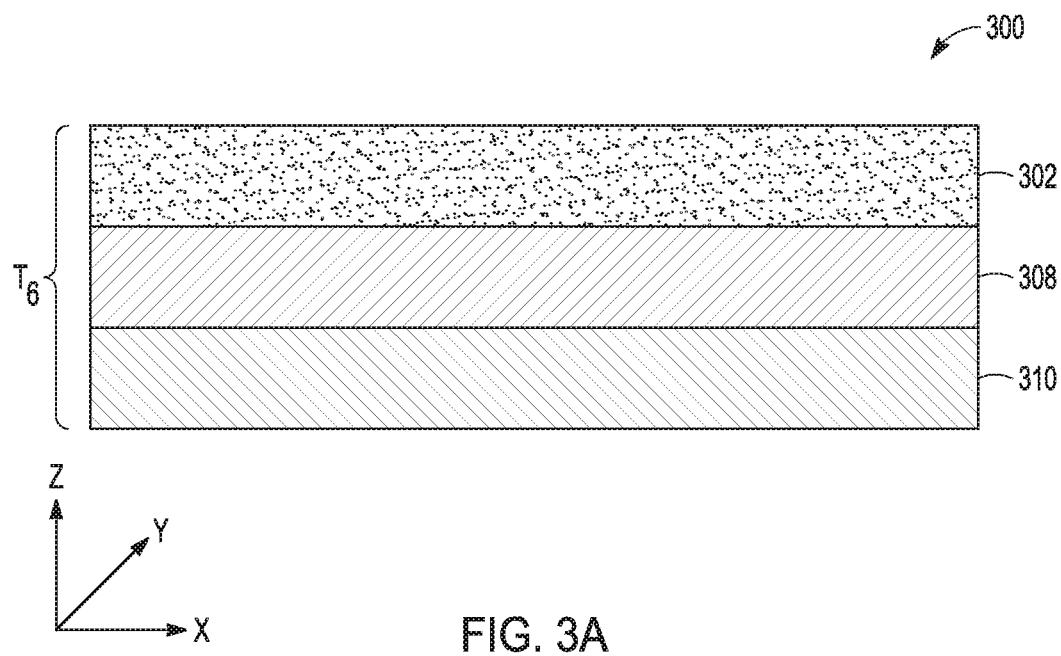
FIG. 3A is a sectional view of another composite shingle, in accordance with various embodiments.
Figure 3B:
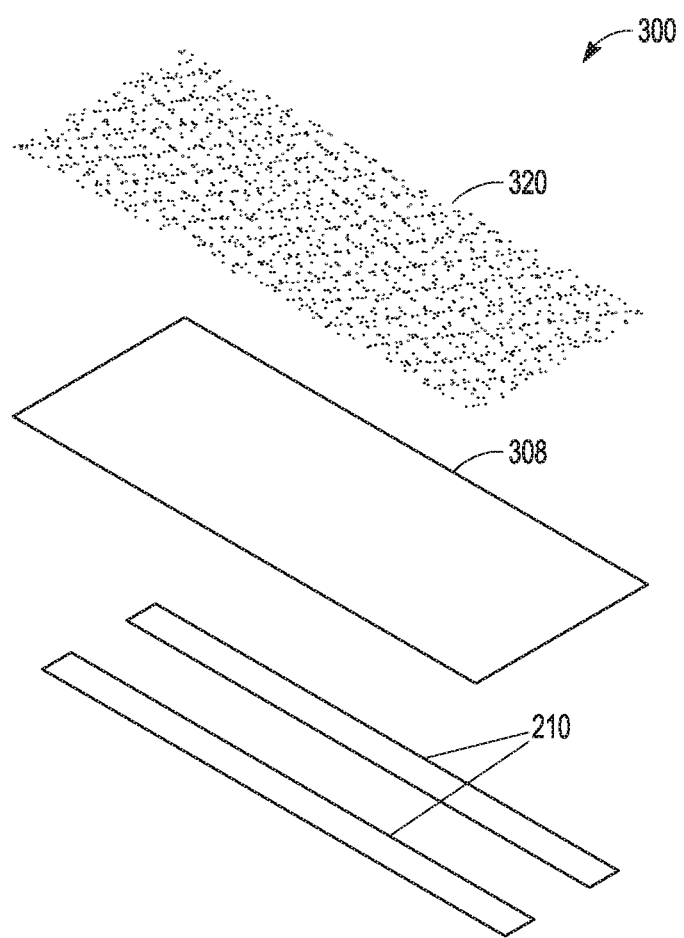
FIG. 3B is an exploded view of the composite shingle of FIG. 3A, in accordance with various embodiments.

As another example of a composite shingle, FIGS. 3A and 3B show composite shingle 300. FIG. 3A is a sectional view of composite shingle 300 and FIG. 3B is an exploded view of composite shingle 300. FIGS. 3A and 3B show many of the same components and are discussed concurrently. Composite shingle 300 includes particle layer 302, polyketone layer 308, and adhesive layer 310. Particle layer 302 can include many of the same components and properties as particle layers 102 or 202. Particle layer 302 is directly attached to polyketone layer 308. Polyketone layer 308 includes the same or some of the materials or properties of polyketone layers 108 or 208. Polyketone layer 308 is directly attached to adhesive layer 310. Adhesive layer 310 includes the same or some of the materials or properties of adhesive layers 110 or 210. Any of the layers of composite shingle 300 can be adhered to each other directly or by a tie layer as described herein.

In composite shingle 300, polyketone layer 308 can be tuned to have suitable properties such as strength and flexibility to allow composite shingle 300 to be free of a reinforcing layer (e.g., a layer including the same or some of the materials or properties of reinforcing layer 106) as well as an asphalt layer (e.g., a layer including the same or some of the materials or properties asphalt layer 104 or 204). This can allow shingle 200 to have a relatively thin profile and a low weight. For example, as compared to composite shingle 100 or 200, a thickness $T_6$ of composite shingle 300 can be about 0.5× less than $T_1$, about 1× less, about 1.5× less, about 2× less, about 2.5× less, about 3× less, about 3.5× less, about 4× less, about 4.5× less, or about 5× less. Similarly, a weight of composite shingle 300 can be about 0.5× less than a weight of composite shingle 100 or 200, about 1× less, about 1.5× less, about 2× less, about 2.5× less, about 3× less, about 3.5× less, about 4× less, about 4.5× less, or about 5× less.

Any of composite shingles 100, 200, or 300 are well suited for many applications. For example, any of composites shingles 100, 200, or 300 can be used to cover a roof. In operation any one of composite shingles 100, 200, or 300 can be contacted with the roof such that adhesive layer 110, 210, or 310 contacts the roof. A securing element such as a nail can be driven through composite shingle 100, 200, or 300 and adhesive layer 110, 210, or 310 can be heated to create adherence to the roof. Further, composite shingles 100, 200, or 300 can be applied to the roof in substantially the same manner with optional overlap between adjacent composite shingles 100, 200, or 300.

According to various embodiments the thickness $T_5$ of composite shingle 200 or thickness $T_6$ of composite shingle 300 can have substantially the same thickness as $T_1$ or can independently be in a range of from about 0.1 times to about 0.6 times the thickness of $T_1$, about 0.2 times to about 0.4 times, less than, equal to, or greater than about 0.1 times, 0.2, 0.3, 0.4, 0.5, or about 0.6 times.

Composite shingles 100, 200, or 300, can be manufactured in any suitable manner. For example, depending on the specific arrangement of the layers any of polyketone layers 108, 208, or 308 can be contacted with at least one of particle layer 102, 202, or 302; asphalt layer 104 or 204; reinforcing layer 106; and adhesive layer 110, 210 or 310. Any layer can be attached to another layer through any suitable technique such as contacting the layers and applying pressure, heat, or a combination thereof or through direct contact with an adhesive material.

EXAMPLES

Various embodiments of the present disclosure can be better understood by reference to the following Examples which are offered by way of illustration. The present disclosure is not limited to the Examples given herein.

The beneficial properties of a polyketone layer versus a polypropylene or fiberglass layer for use in a composite shingle were examined. Polyketone layers showed superior performance as opposed to the comparative polypropylene and fiberglass layers thus indicating that inclusion of polyketone in a composite shingle would be beneficial.

TABLE 1

Materials

| Material | Supplier |
|---|---|
| Polyketone | A polyketone polymer available under the trade designation M630F from Hyosung Polyketone, Seoul KR |
| Polypropylene | A blend of polypropylene polymer available under the trade designation Lyondell Bassel Hifax CA10A from Rotterdam, ND and Lyondell Basset Hifax SC204 from Rotterdam, ND |
| Fiberglass | A fiberglass material |

Examples 1 and 2 were polyketone layers. ASTM D5199-01 (2001) was used to measure thickness of the polyketone layer. ASTM D751 (2006) was used to measure the weight of the polyketone layer. ASTM D638-08 (2008) was used to measure tensile strength and elongation of the polyketone layer. ASTM D1922-06a (2006) was used to determine average force to propagate tearing through a specified length of the polyketone layer (Elmendorf). ASTM D4833-07 (2007) was used to measure the index puncture resistance of the polyketone layer. ASTM D1709-15a (2015) was used to determine the energy amount that causes plastic the polyketone layer to fail under the impact of a free-falling dart. Results from Examples 1 and 2 are provided in Table 2.

TABLE 2

Properties of Examples 1 and 2

| PROPERTY | METHOD | | Example 1 | Example 2 |
|---|---|---|---|---|
| Thickness (mils) | ASTM D5199 | | 5.19 | 7.53 |
| Weight (lbs/msf) | ASTM D751 | | 31.04 | 15.8 |
| Tensile (ppi) | ASTM D638 | MD | 56.85 | 28.4 |
| | | σ | 10 | 4.0 |
| | | TD | 54.03 | 22.0 |
| | | σ | 6.47 | 3.9 |
| | | AVG | 55.4 | 25.2 |
| | | σ | 6.0 | 2.8 |
| Elongation (%) | | MD | 351.93 | 301.2 |
| | | σ | 48.05 | 37.9 |
| | | TD | 359.7 | 259.3 |
| | | σ | 44 | 78.7 |
| | | AVG | 355.8 | 280.3 |
| | | σ | 32.6 | 43.7 |
| Elmendorf (g) | ASTM D1922 | MD | 301.5 | 125.6 |
| | | σ | 42 | 28.0 |
| | | TD | 435.7 | 240.6 |
| | | σ | 55.1 | 54.5 |
| | | AVG | 368.6 | 183.1 |
| | | σ | 34.6 | 30.6 |
| Puncture (lbf) | ASTM D4833 | | 40.65 | 20.3 |
| | | σ | 6.24 | 2.1 |
| Impact Method B (g) | ASTM D1709 | | <500 | <500 |

Comparative Examples 1-5 were polypropylene layers and Comparative Example 6 was a fiberglass layer. ASTM D5199-01 (2001) was used to measure thickness of the polypropylene layers and fiberglass layer. ASTM D751 (2006) was used to measure the weight as well as the tongue tear of the polypropylene layers and fiberglass layer, ASTM D882-16 (2016) was used to measure tensile strength and elongation of the polypropylene layers and fiberglass layer. ASTM D4833-07 (2007) was used to measure the index puncture resistance of the polypropylene layers and fiberglass layer. ASTM D1709-15a (2015) was used to determine the energy amount that causes plastic the polypropylene layers and fiberglass layer to fail under the impact of a free-falling dart. Results from Comparative Examples 1-6 are provided in Table 3.

TABLE 3

Properties of Comparative Examples 1-6

| PROPERTY | METHOD | | Comparative Example 1 | Comparative Example 2 | Comparative Example 3 | Comparative Example 4 | Comparative Example 5 | Comparative Example 6 |
|---|---|---|---|---|---|---|---|---|
| Weight (lbs/msf) | ASTM D751 | | 30.08 | 30.08 | 30.13 | 35.00 | 36.70 | 18.38 |
| Thickness (mils) | ASTM D5199 | | 17.22 | 15.53 | 14.76 | 16.48 | 14.61 | 20.42 |
| Tensile (lbf) | ASTM D882 | MD | 60.36 | 29.88 | 29.89 | 41.54 | 58.6 | 25.65 |
| | | σ | 7.8 | 15 | 11.8 | 11.9 | 5.7 | 3.4 |
| | | TD | 10.69 | 12.36 | 13.38 | 14.6 | 15.78 | 5.44 |
| | | σ | 2.8 | 1.7 | 1.6 | 4.1 | 1.8 | 0.9 |
| | | AVG | 35.5 | 21.1 | 21.6 | 28.1 | 37.2 | 15.5 |
| | | σ | 4.1 | 7.5 | 6.0 | 6.3 | 3.0 | 1.8 |
| Elongation (%) | | MD | 2.42 | 2.52 | 2.09 | 3.54 | 2.43 | 0.87 |
| | | σ | 0 | 0 | 0.7 | 2.2 | 0 | 0 |
| | | TD | 19.76 | 6.09 | 4.09 | 7.55 | 8.88 | 4.42 |
| | | σ | 14.7 | 6.6 | 2.4 | 5.5 | 9 | 6.4 |
| | | AVG | 11.1 | 4.3 | 3.1 | 5.5 | 5.7 | 2.6 |
| | | σ | 7.4 | 3.3 | 1.3 | 3.0 | 4.5 | 3.2 |
| Tongue Tear (lbt) | ASTM D751 | MD | 3.84 | 3.17 | 2.47 | 1.95 | 3.19 | 1.94 |
| | | σ | 0.5 | 0.5 | 0.3 | 0.3 | 0.6 | 0.6 |
| | | TD | 2.07 | 1.8 | 1.43 | 3.07 | 1.41 | 1.22 |
| | | σ | 0.4 | 0.3 | 0.4 | 0.4 | 0.6 | 0.1 |
| | | AVG | 3.0 | 2.5 | 2.0 | 2.5 | 2.3 | 1.6 |
| | | σ | 0.3 | 0.3 | 0.3 | 0.3 | 0.4 | 0.3 |
| Puncture (lbt) | ASTM D4833 | σ | 12.13 / 2 | 13.14 / 2.3 | 13.24 / 1.5 | 14.6 / 2.1 | 16.09 / 1.9 | 11.74 / 2.9 |

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure.

ADDITIONAL EMBODIMENTS

The following exemplary embodiments are provided, the numbering of which is not to be construed as designating levels of importance:

Embodiment 1 provides a composite shingle comprising:
a particle layer; and
a polyketone layer proximate to the particle layer.

Embodiment 2 provides the composite shingle of Embodiment 1, wherein the particle layer and the polyketone layer are in direct contact.

Embodiment 3 provides the composite shingle of Embodiment 1, further comprising an asphalt layer between the particle layer and the polyketone layer.

Embodiment 4 provides the composite shingle of any one of Embodiments 1-3, wherein the particle layer comprises a plurality of particles disposed substantially in a plane.

Embodiment 5 provides the composite shingle of Embodiment 4, wherein the plurality of minerals comprise monolithic particles, agglomerations of particles, or mixtures thereof.

Embodiment 6 provides the composite shingle of any one of Embodiments 4 or 5, wherein an individual particle of the plurality of particles comprises a material that is a mineral, a plastic, a metal, a cement, a clay, a glass, a ceramic, a wood, a wood fiber, a composite, or a mixture thereof.

Embodiment 7 provides the composite shingle of any one of Embodiments 4-6, wherein individual particles of the plurality of particles are randomly distributed in the plane.

Embodiment 8 provides the composite shingle of any one of Embodiments 4-7, wherein the individual particles are distributed in the plane according to a predetermined pattern.

Embodiment 9 provides the composite shingle of any one of Embodiments 4-8, wherein the individual particles are substantially the same color.

Embodiment 10 provides the composite shingle of any one of Embodiments 4-9, wherein a first portion of the individual particles and a second portion of the individual particles are different colors.

Embodiment 11 provides the composite shingle of any one of Embodiments 4-10, wherein a grade of each individual particle is substantially the same.

Embodiment 12 provides the composite shingle of any one of Embodiments 4-11, wherein a grade of at least two individual particles is different.

Embodiment 13 provides the composite shingle of any one of Embodiments 4-12, wherein the mass of the particles per area of the composite shingle is in a range of from about 1 lbs/100 ft$^2$ to about 500 lbs/100 ft$^2$.

Embodiment 14 provides the composite shingle of any one of Embodiments 4-13, wherein a wt/100 sq. ft. of the plurality of particles is in a range of from about 20 lbs. to about 50 lbs.

Embodiment 15 provides the composite shingle of any one of Embodiments 1-14, wherein the polyketone layer comprises a polyketone in a range of from about 20 wt % to about 100 wt % of the polyketone layer.

Embodiment 16 provides the composite shingle of Embodiment 15, wherein the polyketone is in a range of from about 90 wt % to about 100 wt % of the polyketone layer.

Embodiment 17 provides the composite shingle of any one of Embodiments 15 or 16, wherein the polyketone comprises a repeating unit having the structure according to Formula I:

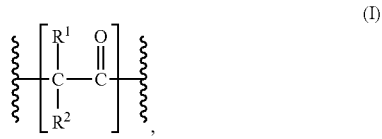

wherein $R^1$ and $R^{12}$ are independently chosen from —H, —OH, substituted or unsubstituted $(C_1-C_{20})$ hydrocarbyl.

Embodiment 18 provides the composite shingle of Embodiment 17, wherein the $(C_1-C_{20})$hydrocarbyl is chosen from $(C_1-C_{20})$alkyl, $(C_1-C_{20})$alkenyl, $(C_1-C_{20})$alkynyl, $(C_1-C_{20})$acyl, $(C_1-C_{20})$cycloalkyl, $(C_1-C_{20})$aryl, and $(C_1-C_{20})$alkoxy, combinations thereof.

Embodiment 19 provides the composite shingle of any one of Embodiments 15-18, wherein the polyketone comprises repeating units according to Formula II:

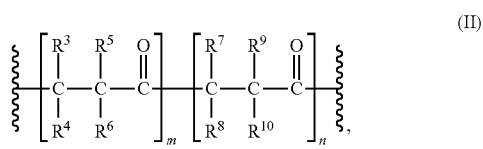

wherein
$R^3$, $R^4$, $R^5$, $R_6$, $R^7$, $R^8$, $R^9$, and $R^{10}$ are independently chosen from —H—, —OH, substituted or unsubstituted $(C_1-C_{20})$hydrocarbyl,
a degree of polymerization of m and n are independently between 0 and 1 and the repeating are in random, block, or alternating configuration.

Embodiment 20 provides the composite shingle of Embodiment 19, wherein the $(C_1-C_{20})$hydrocarbyl is chosen from $(C_1-C_{20})$alkyl, $(C_1-C_{20})$alkenyl, $(C_1-C_{20})$alkynyl, $(C_1-C_{20})$acyl, $(C_1-C_{20})$cycloalkyl, $(C_1-C_{20})$aryl, and $(C_1-C_{20})$alkoxy, combinations thereof.

Embodiment 21 provides the composite shingle of any one of Embodiments 19 or 20, wherein $R^{10}$ is —$CH_3$.

Embodiment 22 provides the composite shingle of any one of Embodiments 19-21, wherein $R^3$, $R^4$, $R^5$, $R^6$, $R^7$, $R^8$, and $R^9$ are each —H.

Embodiment 23 provides the composite shingle of any one of Embodiments 17-22, wherein the polyketone is a copolymer and further comprises a repeating unit derived from ethylene, propylene, vinyl chloride, vinylidene chloride, styrene, acrylonitrile, tetrafluoroethylene, methyl methacrylate, vinyl acetate, isoprene, chloroprene, or a mixture thereof.

Embodiment 24 provides the composite shingle of Embodiment 23, wherein the polyketone copolymer is a random copolymer, block copolymer, or alternating copolymer.

Embodiment 25 provides the composite shingle of any one of Embodiments 17-24, wherein the polyketone layer comprises a plurality of polyketone polymers having different weight-average molecular weights.

Embodiment 26 provides the composite shingle of any one of Embodiments 15-25, wherein the polyketone layer further comprises a colorant.

Embodiment 27 provides the composite shingle of Embodiment 26, wherein the colorant is in a range of from about 0.001 wt % to about 8 wt % of the polyketone layer.

Embodiment 28 provides the composite shingle of any one of Embodiments 26 or 27, wherein the colorant is in a range of from about 0.01 wt % to about 3 wt % of the polyketone layer.

Embodiment 29 provides the composite shingle of any one of Embodiments 15-28, wherein the polyketone layer further comprises a flame retardant.

Embodiment 30 provides the composite shingle of Embodiment 29, wherein the flame retardant is in a range of from about 0.4 wt % to about 20 wt % of the polyketone layer.

Embodiment 31 provides the composite shingle of any one of Embodiments 29 or 30, wherein the flame retardant is in a range of from about 4 wt % to about 15 wt % of the polyketone layer.

Embodiment 32 provides the composite shingle of any one of Embodiments 29-31, wherein the flame retardant is chosen from a phosphorous-containing flame retardant additive, a halogen-containing flame retardant, a metal-hydroxide-containing flame retardant, and a mixture thereof.

Embodiment 33 provides the composite shingle of Embodiment 32, wherein the flame retardant is a phosphorous-containing flame retardant comprising at least one of an organophosphorus compound, a triraryl phosphate, a phosphite, a phosphonate, a polyphosphate, a polyphosphate, a polyphosphonate, and a phosphinate.

Embodiment 34 provides the composite shingle of any one of Embodiments 15-33, wherein the polyketone layer further comprises a stabilizer chosen from an antioxidant, a hindered amine light stabilizer, an ultraviolet absorber, an antioxidant, an organosulfur compound, or a mixture thereof.

Embodiment 35 provides the composite shingle of Embodiment 34, wherein the stabilizer ranges from about 0.5 wt % to about 20 wt % of the polyketone layer.

Embodiment 36 provides the composite shingle of any one of Embodiments 34 or 35, wherein the stabilizer ranges from about 5 wt % to about 10 wt % of the polyketone layer.

Embodiment 37 provides the composite shingle of any one of Embodiments 1-36, wherein a thickness of the polyketone layer is in a range of from about 0.5 mm to about 10 mm.

Embodiment 38 provides the composite shingle of any one of Embodiments 1-37, wherein a thickness of the polyketone layer is in a range of from about 1 mm to about 3 mm.

Embodiment 39 provides the composite shingle of any one of Embodiments 1-38, wherein the polyketone layer is substantially free of at least one of a polyethylene, a polypropylene, and a mixture thereof.

Embodiment 40 provides the composite shingle of any one of Embodiments 15-39, wherein the polyketone layer further comprises a filler.

Embodiment 41 provides the composite shingle of Embodiment 40, wherein the filler is in a range of from about 1 wt % to about 60 wt % of the polyketone layer.

Embodiment 42 provides the composite shingle of any one of Embodiments 40 or 41, wherein the filler comprises calcium carbonate, talc, carbon black, or mixtures thereof.

Embodiment 43 provides the composite shingle of any one of Embodiments 15-42, wherein the polyketone layer is a composite comprising:
a first layer comprising the polyketone;
a second layer comprising the polyketone; and
a plastic layer that is free of the polyketone and disposed between the first and second layer.

Embodiment 44 provides the composite shingle of any one of Embodiments 1-43, wherein the polyketone layer further comprises at least one of a woven and non-woven material.

Embodiment 45 provides the composite shingle of Embodiment 44, wherein the woven or non-woven material comprises fiber glass, nylon, cotton, cellulosic fiber, wool, rubber, or a mixture thereof.

Embodiment 46 provides the composite shingle of any one of Embodiments 1-45, further comprising an asphalt layer located between the particle layer and the polyketone layer.

Embodiment 47 provides the composite shingle of Embodiment 46, wherein the asphalt layer comprises asphalt in a range of from about 30 wt % to about 100 wt % of the asphalt layer.

Embodiment 48 provides the composite shingle of Embodiment 46, wherein the asphalt is in a range of from about 90 wt % to about 100 wt % of the asphalt layer.

Embodiment 49 provides the composite shingle of any one of Embodiments 47 or 48, wherein the asphalt layer further comprises an asphalt filler.

Embodiment 50 provides the composite shingle of Embodiment 49, wherein the asphalt filler is in a range of from about 1 wt % to about 50 wt % of the asphalt layer.

Embodiment 51 provides the composite shingle of any one of Embodiments 49 or 50, wherein the asphalt filler is in a range of from about 5 wt % to about 20 wt % of the asphalt layer.

Embodiment 52 provides the composite shingle of any one of Embodiments 49-51, wherein the asphalt filler comprises limestone, plastic, or a mixture thereof.

Embodiment 53 provides the composite shingle of any one of Embodiments 46, further comprising a reinforcing layer disposed between the asphalt layer and the polyketone layer.

Embodiment 54 provides the composite shingle of Embodiment 53, wherein the reinforcing layer comprises at least one of a woven and non-woven material.

Embodiment 55 provides the composite shingle of Embodiment 54, wherein the woven or non-woven material comprises fiber glass, nylon, cotton, cellulosic fiber, wool, rubber, or a mixture thereof.

Embodiment 56 provides the composite shingle of any one of Embodiments 1-55, further comprising a clear coat disposed over the particle layer to form an external surface of the composite shingle.

Embodiment 57 provides the composite shingle of any one of Embodiments 1-56, further comprising an adhesive layer disposed on the polyketone layer.

Embodiment 58 provides the composite shingle of Embodiment 57, wherein the adhesive layer comprises an asphalt.

Embodiment 59 provides the composite shingle of any one of Embodiments 1-58, comprising:
a particle layer comprising a plurality of particles disposed substantially in a plane;
an asphalt layer in direct contact with the particle layer;
a polyketone layer in direct contact with the asphalt layer; and
an adhesive layer contacting the polyketone layer.

Embodiment 60 provides the composite shingle of Embodiment 59, comprising a reinforcing layer proximate to the particle layer.

Embodiment 61 provides the composite shingle of any one of Embodiments 59 or 60, wherein the polyketone layer is free of at least one of a polyethylene and a polypropylene.

Embodiment 62 provides the composite shingle of any one of Embodiments 1-61 further comprising an interlayer adhesive layer disposed between any layer of the composite shingle.

Embodiment 63 provides the composite shingle of Embodiment 62, wherein the interlayer adhesive layer comprises asphalt a tie layer material, or a mixture thereof.

Embodiment 64 provides a roof comprising the composite shingle of any one of Embodiments 1-63.

Embodiment 65 provides a method of using the composite shingle of any one of Embodiments 1-64, the method comprising forming a roof comprising the composite shingle of Embodiment 1.

Embodiment 66 provides a method of using the composite shingle of any one of Embodiments 1-65, the method comprising:
contacting the composite shingle with a substrate; and
adhering the composite shingle to the substrate.

Embodiment 67 provides the method of Embodiment 66, wherein the composite shingle is a first composite shingle and the method further comprises attaching a second composite shingle to a portion of the first composite shingle.

Embodiment 68 provides the method of any one of Embodiments 66 or 67, wherein the substrate is a roof.

Embodiment 69 provides a method of making the composite shingle of any one of Embodiments 1-68, the method comprising contacting the polyketone layer with at least one of the particle layer, the asphalt layer, the reinforcing layer, and the adhesive layer.

Embodiment 70 provides the method of Embodiment 69, further comprising at least partially embedding the reinforcing layer in the polyketone layer.

Embodiment 71 provides the method of Embodiment 70, further comprising at least partially embedding the asphalt layer in the reinforcing layer.

Embodiment 72 provides the method of Embodiment 71, further comprising disposing the particle layer on the asphalt layer.

Embodiment 73 provides the method of Embodiment 69, further comprising contacting the asphalt layer and the polyketone layer.

Embodiment 74 provides the method of Embodiment 73, wherein the asphalt layer and the polyketone layer comprise an adhesive other than asphalt disposed therebetween.

Embodiment 75 provides the method of Embodiment 73, further comprising disposing the particle layer on the asphalt layer.

Embodiment 76 provides the composite shingle of any one of Embodiments 1-64, wherein a thickness of the polyketone layer is in a range of from about 12 urn to about 255 µm.

Embodiment 77 provides the composite shingle of any one of Embodiments 1-64, wherein a thickness of the polyketone layer is in a range of from about 12 µm to about 100 µm.

Embodiment 78, provides the composite shingle according to any one of Embodiments 1-64 or 77, of the present disclosure where a thickness $T_1$ of composite shingle 100 can be in a range of from about 12 µm to about 510 µm, about 12 µm to about 255 µm, less than, equal to, or greater than about 12 µm, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, or about 510 µm.

Embodiment 79, provides the composite shingle according to any one of Embodiments 1-64 or 77-78, of the present disclosure where a thickness $T_4$ of polyketone layers 108, 208, or 308 can independently be in a range of from about 12 µm to about 255 µm, about 12 µm to about 100 µm, less than, equal to, or greater than about 12 µm, 20, 30, 40, 50, 55, 60, 70, 80, 90, 100, 110, 120, 130, 140, 150, 160, 170, 180, 190, 200, 210, 220, 230, 240, 250, or about 260 µm.

Embodiment 80, provides the composite shingle according to any one of Embodiments 1-64 or 77-79, of the present disclosure where the thickness $T_5$ of composite shingle 200 or thickness $T_6$ of composite shingle 300 can have substantially the same thickness as $T_1$ or can independently be in a range of from about 0.1 times to about 0.6 times the thickness of $T_1$, about 0.2 times to about 0.4 times, less than, equal to, or greater than about 0.1 times, 0.2, 0.3, 0.4, 0.5, or about 0.6 times.

What is claimed is:

1. A composite shingle comprising:
   a particle layer; and
   a polyketone layer, comprising a polyketone in a range of from about 20 wt % to about 100 wt % of the polyketone layer proximate to the particle layer.

2. The composite shingle of claim 1, further comprising an adhesive between the particle layer and the polyketone layer.

3. The composite shingle of claim 2, wherein the adhesive comprises asphalt.

4. The composite shingle of claim 1, wherein the polyketone layer comprises a polyketone in a range of from about 90 wt % to about 100 wt % of the polyketone layer.

5. The composite shingle of claim 4, wherein the polyketone comprises a repeating unit having the structure according to Formula I:

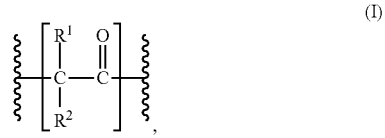

(I)

wherein $R^1$ and $R^2$ are independently chosen from —H, —OH, substituted or unsubstituted $(C_1-C_{20})$ hydrocarbyl.

6. The composite shingle of claim 5, wherein the $(C_1-C_{20})$hydrocarbyl is chosen from $(C_1-C_{20})$alkyl, $(C_1-C_{20})$alkenyl, $(C_1-C_{20})$alkynyl, $(C_1-C_{20})$acyl, $(C_1-C_{20})$cycloalkyl, $(C_1-C_{20})$aryl, and $(C_1-C_{20})$alkoxy, combinations thereof.

7. The composite shingle of claim 4, wherein the polyketone comprises repeating units according to Formula II:

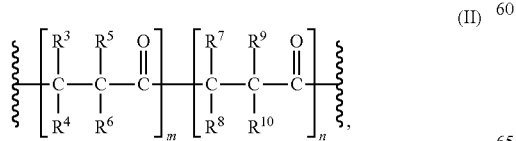

(II)

wherein
$R^3$, $R^4$, $R^5$, $R^6$, $R^7$, $R^8$, $R^9$, and $R^{10}$ are independently chosen from —H, —OH, substituted or unsubstituted $(C_1-C_{20})$hydrocarbyl,
a degree of polymerization of in and n are independently between 0 and l and the repeating are in random, block, or alternating configuration.

8. The composite shingle of claim 7, wherein the $(C_1-C_{20})$hydrocarbyl is chosen from $(C_1-C_{20})$alkyl, $(C_1-C_{20})$alkenyl, $(C_1-C_{20})$alkynyl, $(C_1-C_{20})$acyl, $(C_1-C_{20})$cycloalkyl, $(C_1-C_{20})$aryl, and $(C_1-C_{20})$alkoxy, combinations thereof.

9. The composite shingle of claim 7, wherein $R^{10}$ is —$CH_3$.

10. The composite shingle of claim 7, wherein $R^3$, $R^4$, $R^5$, $R^6$, $R^7$, $R^8$, and $R^9$ are each —H.

11. The composite shingle of claim 1, further comprising an asphalt layer located between the particle layer and the polyketone layer.

12. The composite shingle of claim 1, further comprising a reinforcing layer at least partially embedded in the polyketone layer.

13. A composite shingle comprising:
    a particle layer comprising a plurality of particles disposed substantially in a plane;
    an asphalt layer in direct contact with the particle layer;
    a polyketone layer, comprising a polyketone in a range of from about 20 wt % to about 100 wt % of the polyketone layer in direct contact with the asphalt layer; and
    an adhesive layer contacting the polyketone layer.

14. The composite shingle of claim 13, wherein the polyketone comprises a repeating unit having the structure according to Formula I:

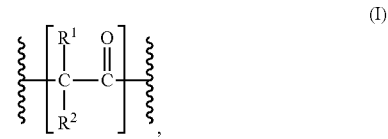

(I)

wherein $R^1$ and $R^2$ are independently chosen from —H, —OH, substituted or unsubstituted $(C_1-C_{20})$ hydrocarbyl.

15. The composite shingle claim 14, wherein the polyketone comprises repeating units according to Formula II:

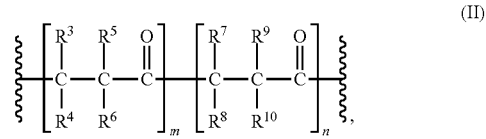

(II)

wherein
$R^3$, $R^4$, $R^5$, $R^6$, $R^7$, $R^8$, $R^9$, and $R^{10}$ are independently chosen from —H, —OH, substituted or unsubstituted $(C_1-C_{20})$hydrocarbyl,
a degree of polymerization of m and n are independently between 0 and 1 and the repeating are in random, block, or alternating configuration.

16. The composite shingle of claim 15, wherein the asphalt layer comprises asphalt in a range of from about 30 wt % to about 100 wt % of the asphalt layer.

17. A method of making a composite shingle, the method comprising contacting a polyketone layer, comprising a polyketone in a range of from about 20 wt % to about 100 wt % of the polyketone layer with at least one of a particle layer, an asphalt layer, a reinforcing layer, and an adhesive layer.

18. The method of claim 17, further comprising at least partially embedding the reinforcing layer in the polyketone layer.

19. The method of claim 17, further comprising at least partially embedding the reinforcing layer in the asphalt layer.

20. The method of claim 17, wherein the asphalt layer and the polyketone layer comprises adhesive disposed therebetween.

* * * * *